US007401159B1

(12) United States Patent
Aviani et al.

(10) Patent No.: US 7,401,159 B1
(45) Date of Patent: *Jul. 15, 2008

(54) DISTRIBUTED NETWORK TRAFFIC LOAD BALANCING TECHNIQUE IMPLEMENTED WITHOUT GATEWAY ROUTER

(75) Inventors: James Aviani, Santa Barbara, CA (US); David Eric Swanson, Santa Barbara, CA (US); Frederick Baker, Santa Barbara, CA (US); Kenneth E. Mueller, II, Santa Barbara, CA (US); Matthew Richard Gnagy, Sacramento, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

This patent is subject to a terminal disclaimer.

(21) Appl. No.: 10/851,456

(22) Filed: May 20, 2004

Related U.S. Application Data

(63) Continuation of application No. 09/569,090, filed on May 10, 2000, now Pat. No. 6,742,044.

(51) Int. Cl.
*G06F 15/173* (2006.01)
*G06F 15/16* (2006.01)
(52) U.S. Cl. .................. 709/238; 709/225; 709/226; 709/229; 709/235; 370/230.1
(58) Field of Classification Search ......... 709/200–201, 709/217–219, 225–229, 235, 238; 370/229–235
See application file for complete search history.

(56) References Cited

U.S. PATENT DOCUMENTS 4,827,411 A 5/1989 Arrowood et al.

(Continued)

FOREIGN PATENT DOCUMENTS

WO WO98/31107 7/1998

OTHER PUBLICATIONS

Valloppillil, Vinod, "*Cache Array Routing Protocol v1.0*", Oct. 20, 1997, Internet-Draft, //ds1.internic/net/internet-drafts/draft-vinod-carp-v1-02.txt, pp. 1-6.

(Continued)

*Primary Examiner*—Bharat Barot
(74) *Attorney, Agent, or Firm*—Dean E. Wolf; Weaver Austin Villeneuve & Sampson LLP

(57) ABSTRACT

The technique of the present invention provides a solution to the problem of routing or redirecting a given client to a replica or proxy server which has a relatively shortest propagation delay to the client. According to the technique of the present invention, a network device referred to as an intercept server sits in front of a host server, and intercepts packets routed to the host server. When desired, packets which are intercepted by the intercept server are replicated, encapsulated and tunneled to selected client servers in the overlay network. The tunneled packets are received and processed by each of the selected client servers, whereupon each of the selected client servers generates a respective spoofed response to the source device identified in the header of the originally intercepted packet. Further, according to the technique of the present invention, each of the selected client servers transmits its respective spoofed response to the identified source device at substantially the same time. The client server associated with the spoofed response which is first received at the identified source device is considered to have the relatively shortest propagation delay to the identified source device, and is identified as the successful client server. Thereafter, the source device will be directed or redirected to communicate directly with the successful client server when subsequently attempting to access information from the host server.

77 Claims, 8 Drawing Sheets

U.S. PATENT DOCUMENTS

| | | | |
|---|---|---|---|
| 4,965,772 | A | 10/1990 | Daniel et al. |
| 5,414,704 | A | 5/1995 | Spinney |
| 5,452,447 | A | 9/1995 | Nelson et al. |
| 5,488,412 | A | 1/1996 | Majeti et al. |
| 5,506,987 | A | 4/1996 | Abramson et al. |
| 5,511,208 | A | 4/1996 | Boyles et al. |
| 5,555,244 | A | 9/1996 | Gupta et al. |
| 5,586,121 | A | 12/1996 | Moura et al. |
| 5,611,049 | A | 3/1997 | Pitts |
| 5,673,265 | A | 9/1997 | Gupta et al. |
| RE35,774 | E | 4/1998 | Moura et al. |
| 5,740,375 | A * | 4/1998 | Dunne et al. ............... 709/238 |
| 5,751,971 | A | 5/1998 | Dobbins et al. |
| 5,774,660 | A | 6/1998 | Brendel et al. |
| 5,787,470 | A | 7/1998 | DeSimone et al. |
| 5,818,845 | A | 10/1998 | Moura et al. |
| 5,828,655 | A | 10/1998 | Moura et al. |
| 5,848,241 | A | 12/1998 | Misinai et al. |
| 5,852,717 | A | 12/1998 | Bhide et al. |
| 5,859,852 | A | 1/1999 | Moura et al. |
| 5,872,773 | A | 2/1999 | Katzela et al. |
| 5,892,903 | A | 4/1999 | Klaus |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 5,996,021 | A * | 11/1999 | Civanlar et al. ............ 709/238 |
| 6,006,264 | A | 12/1999 | Colby et al. |
| 6,006,266 | A | 12/1999 | Murphy et al. |
| 6,016,388 | A | 1/2000 | Dillon |
| 6,052,718 | A | 4/2000 | Gifford |
| 6,345,294 | B1 | 2/2002 | O'Toole et al. |
| 6,578,077 | B1 * | 6/2003 | Rakoshitz et al. ........... 709/226 |
| 6,742,044 | B1 * | 5/2004 | Aviani et al. ............... 709/235 |

OTHER PUBLICATIONS

Ousterhout, John K., "*A Trace-Driven Analysis of the UNIX 4.2 BSD File System*," Jan. 2, 1993, *Computer Science Division, Electrical Engineering and Computer Science*, University of California, Berkeley, CA, pp. 1-12.

Welch, Brent, "A Comparison of the Vnode and Sprite File System Architectures," *Proceedings of the File System Workshop*, May 1992, pp. 29-44.

Ousterhout, John K., "*Beating the I/O Bottleneck: A Case for Log-Structured File Systems*," Jan. 30, 1992, *Computer Science Division, Electrical Engineering anc Computer Sciences*, University of California, Berkeley, CA, pp. 1-17.

Martin Arlitt, Ludmila Cherkasova, John Dilley, Rich Friedrich And Tai Jin, Of Hewlett-Packard Laboratories,"*Evaluating Content Management Techniques For Web Proxy Caches*," Apr. 30, 1999, 9 pages.

Aviani, Jr. et al., *Wide Area Load Balancing Of Web Traffic*, filed Jun. 28, 2000, U.S. Appl. No. 09/606,418.

Cieslak et al., *Network Cache-Based Content Routing*, filed Jun. 5, 2000, U.S. Appl. No. 09/588,027.

Gourlay et al., *Phased Learning Approach To Determining Closest Content Serving Sites*, filed Aug. 31, 2000, U.S. Appl. No. 09/652,766.

Gourlay et al., *Path Selection System*, filed Dec. 19, 2001, U.S. Appl. No. 10/034,368.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery-"How FreeFlow Works," webmaster@akamai.com 1999-2000.

Digital Island, Inc. -e-Business Without Limits-, "Enabling Technologies," .digisle.net, no date.

Internap, "Preferred Collocation Services," .internap.com Copyright © 2001 Internap Network Services Corporation.

Meyer, et al., Request For Comments No. 2026, entitled, "Generic Routing Encapsulation (GRE)," Jan. 2000, Internet Engineering Task Force, 9 pages.

Mockapetris, P., Request For Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 Pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

\* cited by examiner

DISTRIBUTED NETWORK TRAFFIC LOAD BALANCING TECHNIQUE IMPLEMENTED WITHOUT GATEWAY ROUTER

RELATED APPLICATION DATA

This application is a continuation of U.S. patent application Ser. No. 09/569,090, entitled "DISTRIBUTED NETWORK TRAFFIC LOAD BALANCING TECHNIQUE IMPLEMENTED WITHOUT GATEWAY ROUTER" by Aviani et al., filed on May 10, 2000 now U.S. Pat. No. 6,742,044, from which priority is claimed pursuant to the provisions of 35 U.S.C. 120. That application is incorporated herein by reference in its entirety and for all purposes.

This invention is related to U.S. patent application Ser. No. 09/569,083, filed May 10, 2000, naming James Aviani, David Eric Swanson, Frederick Baker, Kenneth E. Mueller II, and Matthew Richard Gnagy as inventors, and entitled, "DISTRIBUTED NETWORK TRAFFIC LOAD BALANCING TECHNIQUE IMPLEMENTED WITHOUT GATEWAY ROUTER." That application is incorporated herein by reference in its entirety and for all purposes.

BACKGROUND OF THE INVENTION

1. Field of the Invention

The present invention relates generally to data networks, and more specifically to a technique for distributed load balancing of network traffic across a data network.

2. Background

Content providers on the World Wide Web are willing to pay a great deal of money to guarantee that their content is delivered quickly and accurately to any given client. Accordingly, a great deal of research has been conducted to address the problem of speeding up HTTP transactions conducted between a client and a server, particularly in situations where there is a relatively large propagation delay between the client and the server.

Although the speed of data transmission across the Internet is continuing to increase, the propagation delay associated with the speed of an electrical signal traveling through a wire or fiberoptic cable (i.e. the speed of light) cannot be reduced. Such delays are becoming a significant factor in the overall propagation delay between the server and client. In order to reduce the overall propagation delay between a given server and a given client, conventional techniques have resorted to replicating the server system, and placing multiple copies of the replicated server system at locations as near as possible to the client.

Thus, for example, a common technique used by content providers is to store content from the host server in co-location spaces that are geographically distributed over a wide area. The co-location spaces form an overlay network that is more costly and less flexible, but provide better service than the traditional Internet. Typically the ISPs which manage the co-location spaces charge the content provider for each megabyte stored in the co-location space. The co-location spaces may be implemented as proxy servers, which pull specific data from the host server in response to specific client requests, or may be implemented as fully replicated servers which include all the information of the host server.

Although the use of co-location spaces will help reduce the overall propagation delay between a server and client, another issue which arises relates to the problem of determining how an arbitrary client is redirected to the nearest replica or proxy server, particularly where it is not known ahead of time which clients will be asking for information and where the clients are located. Some conventional techniques have been implemented to address this problem, but typically require the use of a gateway router.

An alternate technique for predicting, for a given client, the nearest replica or proxy server to that client has been developed by Akamai Technologies, Inc. (of Cambridge, Mass.). The proprietary Akamai routing technique involves constructing a network map of the Internet topology. The network map information is stored in a central network operating center or NOC which is located on a specific Akamai server. When a client attempts to access a content provider's site which is part of the Akamai overlay network of co-location servers, the client will initiate a DNS resolution request, which is resolved by the NOC server. The NOC dynamically resolves the requested domain name to a co-location server address that is nearest topologically to the client, using information from the network map.

However, in order for Akamai's routing technique to be successfully implemented, the network topology map must be continually updated and maintained. According to at least one school of thought, however, maintaining an accurate Internet topology may be nearly impossible since the Internet topology is dynamically changing and is exponentially growing in size and complexity each day.

More importantly, the Akaimi routing technique is limited only to resolving DNS queries implemented using DNS protocol. Currently, the Akaimi technique for re-routing clients to a nearest proxy server is not extendable to other protocols such as, for example, TCP. Thus, for example, when a client obtains a particular IP address of a server, and subsequently attempts to initiate a TCP connection with that server, the Akaimi technique can not be used to re-route the client to establish a TCP connection with a topologically closer proxy server.

Accordingly, in light of the foregoing, there exists a continual need to develop alternative solutions for providing fast and efficient routing and load balancing of web traffic across data networks.

SUMMARY OF THE INVENTION

According to specific embodiments of the present invention, a technique is provided for routing a client device to access a specific client server in a data network. The data network may include at least one host server, a sub-network of client servers associated with the at least one host server, and at least one client system. According to one embodiment, the data network corresponds to the Internet, wherein the at least one host server corresponds to the host server of a content provider, the sub-network of client servers corresponds to an overlay network of proxy or replica servers.

The technique of the present invention provides a solution to the problem of routing or redirecting a given client to a replica or proxy server which has a relatively shortest propagation delay to the client. According to the technique of the present invention, a network device referred to as an intercept server sits in front of a host server, and intercepts packets routed to the host server. When desired, packets which are intercepted by the intercept server are replicated, encapsulated and tunneled to selected client servers in the overlay network. The tunneled packets are received and processed by each of the selected client servers, whereupon each of the selected client servers generates a respective spoofed response to the source device identified in the header of the originally intercepted packet. Further, according to the technique of the present invention, each of the selected client servers transmits its respective spoofed response to the identified source device at substantially the same time. The client server associated with the spoofed response which is first received at the identified source device is considered to have the relatively shortest propagation delay to the identified source device, and is identified as the successful client server. Thereafter, the source device will be directed or redirected to communicate directly with the successful client server when subsequently attempting to access information from the host server.

Other embodiments of the present invention are directed to a method and computer program product for routing a client device to access a specific server in a data network. The data network includes a sub-network of client servers which are configured to include information corresponding to information stored on at least one host server. A first packet is received from a source device. Information relating to the first packet is then forwarded to a first portion of client servers in the sub-network. Each of the first portion of client servers is then caused to transmit, at substantially the same time, a respective spoofed response to the source device. Each spoofed response may be generated using information from the first packet. According to a specific embodiment, a successful client server may then be identified as being associated with generating a particular spoofed response that was first received at the source device. An ID of the source device may then be binded with an ID of the successful client server in order to cause subsequent requests from the source device to access information from the host server to be routed to the successful client server device for processing. Further, according to a specific implementation, the first packet received from the source device may correspond to a SYN segment of a TCP protocol for communicating with the host server. Additionally, each spoofed response may comprise a SYN, ACK segment which includes a unique sequence number relating to an identity of the client server which generated the spoofed response.

Additional embodiments of the present invention are directed to a method and computer program product for routing traffic in a data network. The data network comprises a sub-network of client servers configured to include information corresponding to information stored on at least one host server. A first packet from a source device is received at a first network device. The source device is identified using information from the first packet. Using the identified source device information, a first portion of the client servers is then selected for forwarding information relating to the first packet. Information relating to the first packet is then forwarded to the first portion of client servers. Each of the first portion of client servers is then caused to transmit a respective spoofed response to the source device at substantially the same time. According to a specific embodiment, the selection of the first portion of client servers may include at least one preferred client server associated with the identified source device, and may further include at least one randomly selected client server from the sub-network of client servers.

Further embodiments of the present invention are directed to a method and computer program product for routing traffic in a data network. The data network includes a sub-network of client servers configured to include information corresponding to information stored on at least one host server. A tunneled packet transmitted from an intercept server is received at a first client server. The tunneled packet includes encapsulated information related to a first packet intercepted by the intercept server. The first packet includes a source address and a destination address. The source address corresponds to a source device which generated the first packet. The first packet information relates to a request to open a communication connection with a host server. The first client server generates a first spoofed response to the first packet request using information from the received tunneled packet. The first spoofed response further includes information for identifying the first client server which generated the first spoofed response. The first spoofed response is then transmitted to the source device. According to a specific implementation, the first packet corresponds to a SYN segment of a communication utilizing a TCP protocol. Further, according to this embodiment, the first spoofed response comprises a SYN, ACK segment which includes a first sequence number relating to an identity of the first client server.

An alternate embodiment of the present invention is directed to a system for routing a client device to access a specific server in a data network. The system comprises a sub-network of client servers configured to include information corresponding to information stored on at least one host server. The system may further comprise at least one intercept server configured to intercept at least one packet routed to a host server. The intercept server is further configured to identify a source device which generated the intercepted packet. The intercept server may further be configured to forward information relating to the first packet to a selected portion of client servers. Further, the intercept server may be configured to cause each of the selected client servers to transmit a respective spoofed response to the source device at substantially the same time.

Another embodiment of the present invention is directed to a network device comprising at least one CPU and memory. The memory may include a first portion of memory configured to store content information which is substantially similar to content information stored on at least one host server in a data network. The network device may further comprise at least one interface for receiving a tunneled packet from an intercept server. The tunneled packet may include encapsulated information relating to a first packet intercepted by the intercept server. The first packet may include a source address and destination address, wherein the source address corresponds to a source device associated with generating the first packet. The first packet information may relate to a request to open a communication connection with the host server. The network device may be further configured to generate, using information from the received tunneled packet, a first spoofed response to the source device request, wherein the first spoofed response includes information for identifying the first client server which generated the first spoofed response. Additionally, the network device may further be configured to transmit the first spoofed response to the source device.

An alternate embodiment of the present invention is directed to a system for routing a source device to access a specific server in a data network. The system comprises a sub-network of client servers configured to include information corresponding to information stored on at least one host server. The system further includes at least one intercept server configured to intercept at least one packet addressed to a host server. The intercepted packet includes information for identifying a source device associated with the packet. The intercept server is further configured to forward information relating to the intercepted packet to a selected portion of the client servers in the sub-network. Each of the selected client servers is configured to transmit, at substantially the same time, a respective spoofed response to the source device, wherein each spoofed response is generated using information from the intercepted packet. According to a specific implementation, the intercept server is configured to identify a successful client server which generated a spoofed response that was first received at the source device. The intercept server is further configured to bind an ID of the source device with an ID of the successful client server device. In this way, subsequent requests from the source device to access information from the host server may be forwarded to the successful client server for processing.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 2:
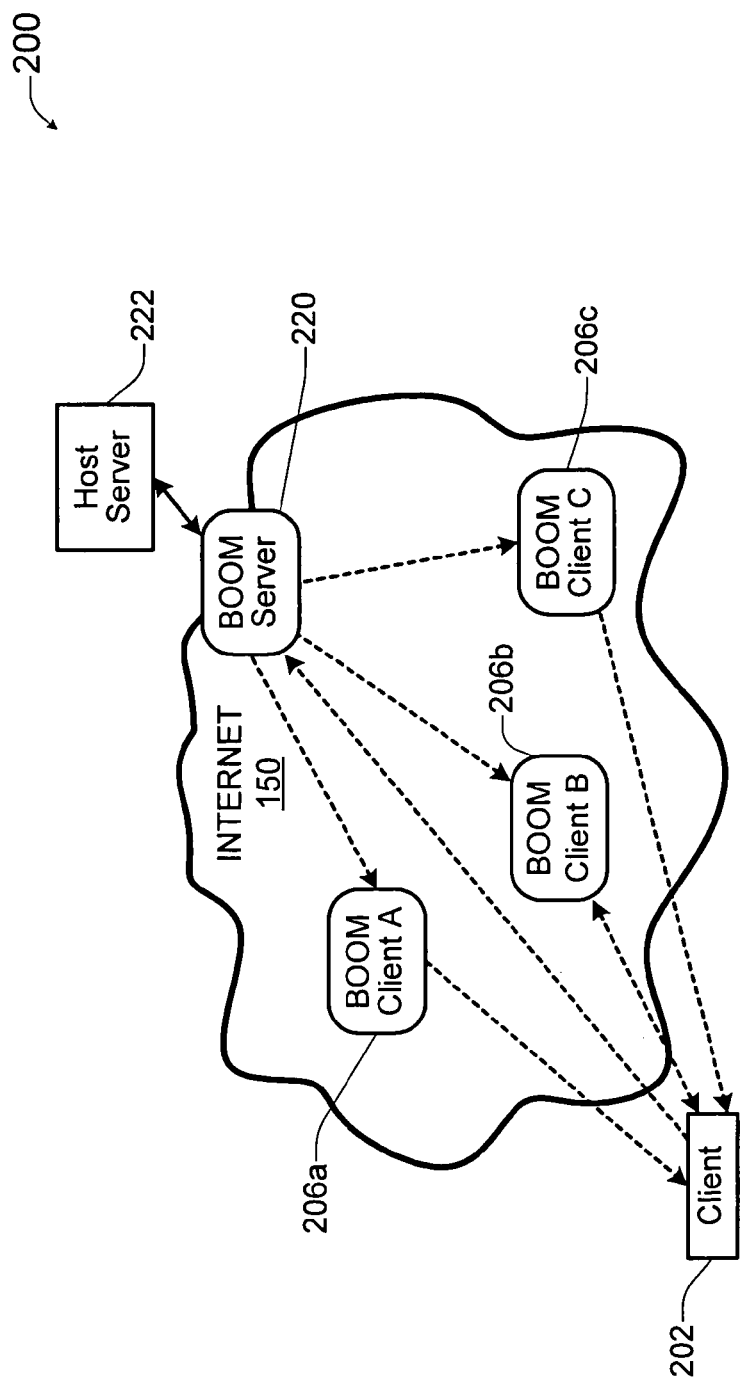
FIG. 2 shows a block diagram of a data network 200 which may be used for implementing the technique of the present invention.
Figure 6A:
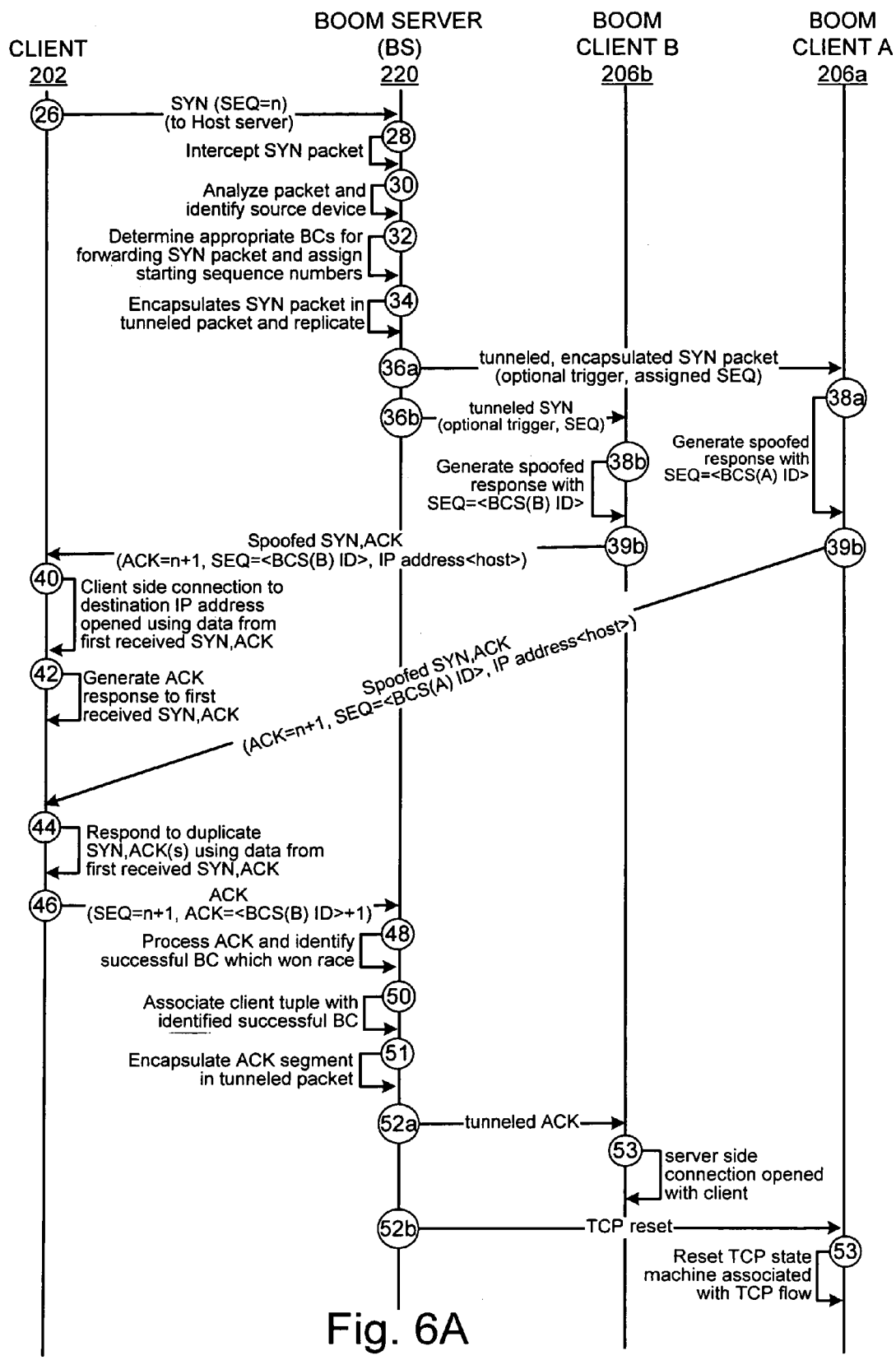
FIGS. 6A, and 6B show flow diagrams illustrating how the technique of the present invention may be implemented in a data network which utilizes a TCP communication protocol.
Figure 6B:
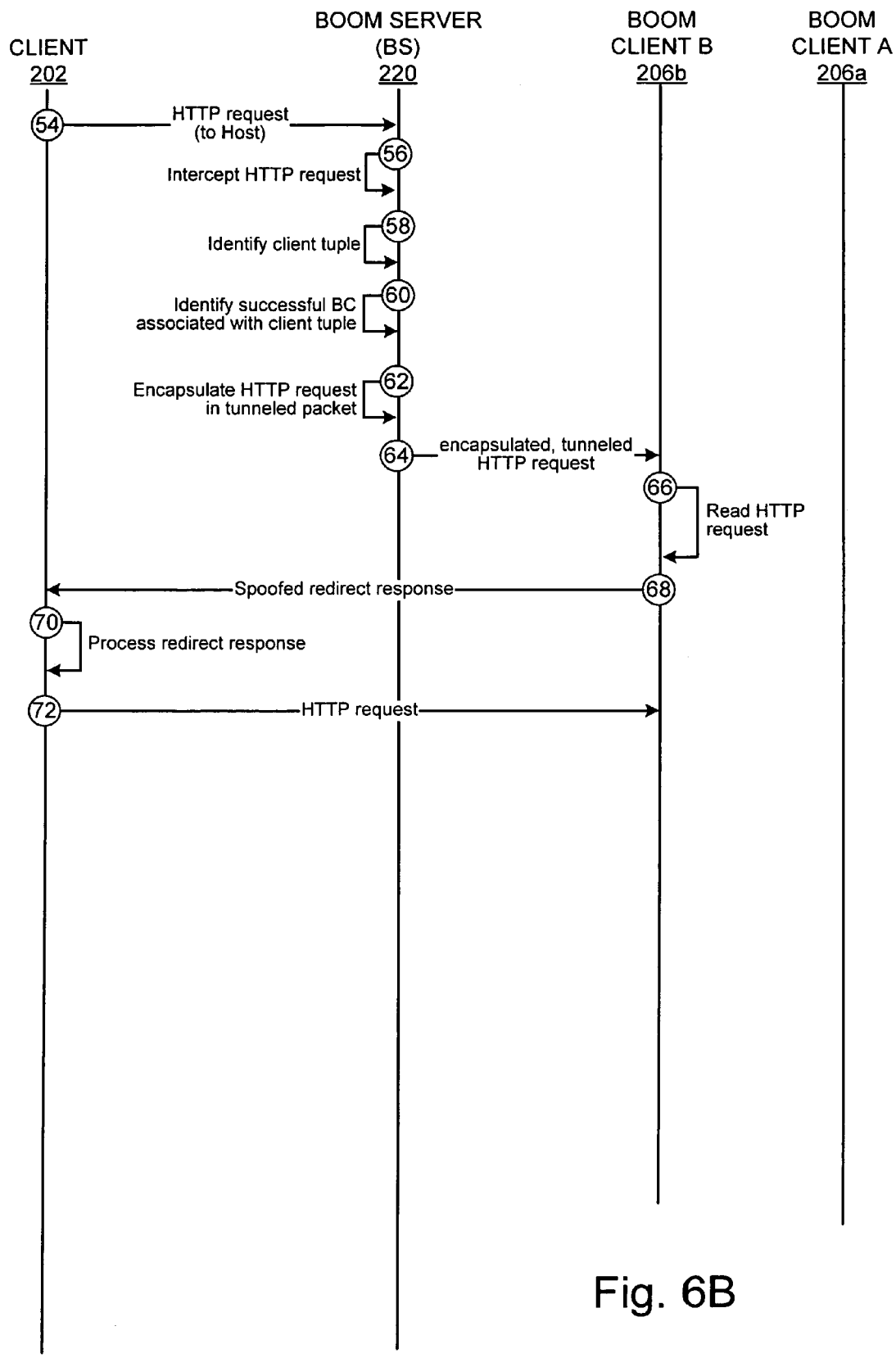

In accordance with the several embodiments of the present invention described in this application, the technique of the present invention may be used to provide a solution to the problem of discovering a nearest replica or proxy server which has the smallest propagation delay to a particular client system, regardless of network changes or failures. A specific embodiment of the technique of the present invention is shown in FIGS. 2, 6A and 6B of the drawings, which illustrate how the technique of the present invention may be implemented in a data network which utilizes a TCP communication protocol. In order to gain a better understanding the TCP implementation of the present invention, it is helpful to review how TCP is implemented over conventional IP networks.

Figure 1A:
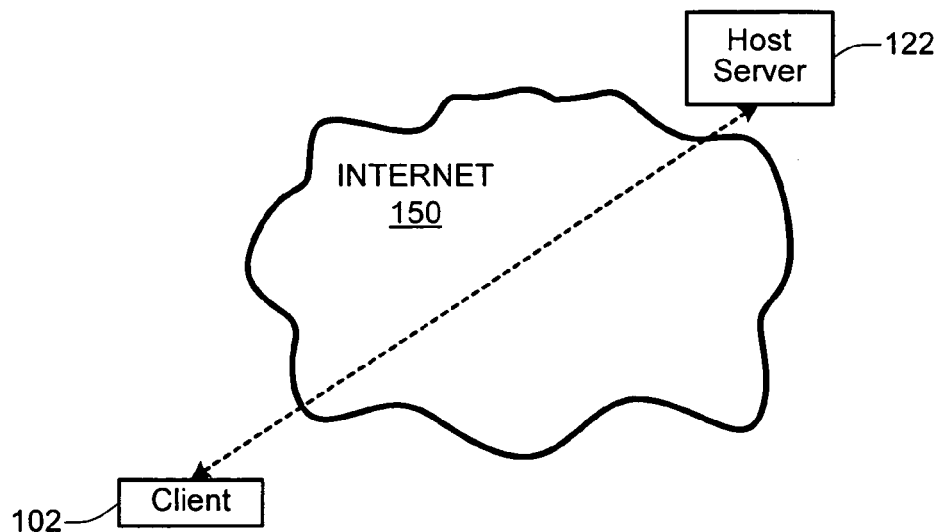
FIG. 1A shows a conventional network configuration for implementing TCP over an IP network.

FIG. 1A shows a conventional network configuration for implementing TCP over an IP network. As shown in FIG. 1A, a client 102 communicates with host server 122 via internet 150. A detailed description of the Transmission Control Protocol (TCP) is described in RFC document number 793, incorporated herein by reference in its entirety for all purposes. A brief description of the conventional TCP handshaking protocol between the client and host server is shown in FIG. 1B of the drawings.

Figure 1B:
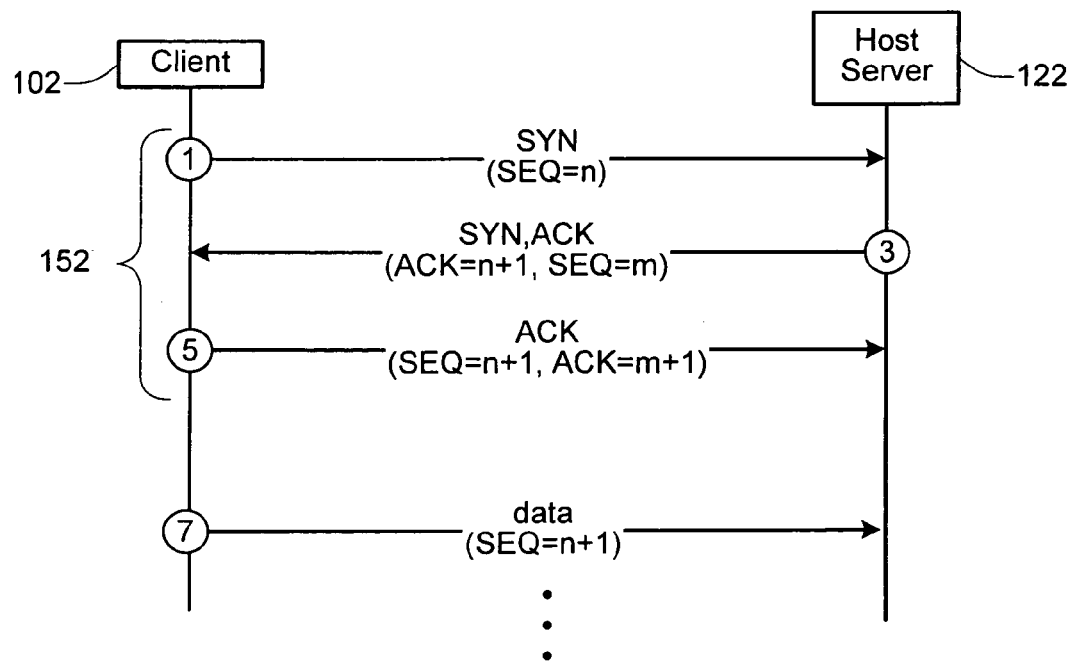
FIG. 1B shows a flow diagram illustrating a conventional TCP handshaking protocol between a client and host server.

Referring to FIG. 1B, when a client 102 wishes to access host server 122, it first performs a three-way handshaking protocol 152 with the host server in order to establish a proper connection with the host server. Thus, as shown in FIG. 1B, the client first transmits (1) a synchronization (SYN) segment to the host server. The SYN segment will include a client sequence number (SEQ=n) which is generated by the client. When the host server receives the SYN segment, it responds (3) by providing a synchronization and acknowledgment (SYN, ACK) segment to the client. The SYN, ACK segment will include a host sequence number (SEQ=m) generated by the host server. The SYN, ACK segment will also include an acknowledgement (ACK=n+1) to the client sequence number, which, according to the conventional TCP protocol, should be equal to the value of the client sequence number (n) incremented by 1.

When the client receives the SYN, ACK segment from the host server, it then responds (5) with an ACK segment, which includes a client sequence number (SEQ=n+1), and an acknowledgment to the host sequence number (ACK=m+1). Once the host server receives the ACK segment from the client, the handshaking protocol between the client and host server is completed, and an open connection is established between the client and host server.

Once an open connection is established between the client and host server, the client may then access data from the host server such as, for example, by submitting (7) an HTTP request to the host server. As shown in the example of FIG. 1B, the HTTP request will also include an appropriate client sequence number (SEQ=n+1) and an appropriate acknowledgment sequence number (ACK=m+1). According to the standardized TCP protocol, it is important that both the client and host server transmit the proper acknowledgment number when responding to the other using the TCP protocol. For example, if the client transmits a sequence number SEQ=100, the host response should include an acknowledgment sequence number ACK=101. Similarly, if the host server transmits a sequence number SEQ=150, the client should respond with an acknowledgment sequence number ACK=151. According to the TCP protocol, if a device receives a packet which includes an improper acknowledgment sequence number, the device will disregard the packet.

FIGS. 2, 6A, and 6B illustrate how the technique of the present invention may be implemented in a data network which utilizes a TCP communication protocol. As shown in FIG. 2, the data network includes a client system 202, a host server 222, a BOOM server or intercept server 220, and a plurality of BOOM client servers 206a, 206b, 206c. Together, the BOOM server 220 and plurality of BOOM client servers form an overlay network of the present invention. Each of the various devices shown in FIG. 2 may communicate with each other via a wide area network such as, for example, the Internet 150.

According to a specific embodiment, at least a portion of the BOOM client servers may be implemented as proxy or replica servers which automatically handle the complex task of retrieving and cashing desired information from the host server, and managing the retrieved data to ensure the cached data is up to date. Alternatively, one or more of the BOOM servers may be implemented as data caches which cache at least a portion of the data located on host server 222, and use the cached data to respond to a variety of different client requests such as, for example, HTTP requests. According to this embodiment, if a BOOM client server receives a request for data which is not cached on that server, the BOOM client server retrieves the desired data from the host server 222 and stores the retrieved data in the BOOM client server cache for servicing subsequent data requests.

FIGS. 6A and 6B illustrate a flow diagram of a specific embodiment for implementing the technique of the present invention over the data network 200 of FIG. 2. In the example of FIG. 6A, it is assumed that a client 202 has obtained the IP address of host server 222, and wishes to access data from the host server such as, for example, by submitting a HTTP request to the host server. However, before the client system is able to send an HTTP request to the host server, it must first initiate the TCP handshaking protocol described previously with respect to FIG. 1B.

Thus, referring to FIG. 6A, at 26, the client system 202 sends a SYN packet to the host server 222. The SYN packet comprises a client sequence number (SEQ=n), and a packet header which includes tuple information such as, for example, a source IP address, a destination IP address, a source port number, and a destination port number.

According to at least one embodiment, the BOOM server 220 is configured to sit in front of the host server 222, and inspect all or a portion of selected packets routed to the host server. When the SYN packet arrives at the host server 222, it is immediately inspected by the BOOM server 220. According to one embodiment, the BOOM server 220 intercepts (28) all packets destined for the host server 222. According to an alternate embodiment, the SYN packet may be intercepted (28) if the BOOM server determines that the source IP address of the SYN packet is not associated with any of the BOOM client servers in the overlay network.

As shown in the example of FIG. 6A, after the BOOM server has intercepted the SYN packet, the BOOM server analyzes the packet and identifies (30) the source device (e.g. client 202) associated with the packet. In an alternate embodiment, the identification of the source device may take place while the packet is being inspected by the BOOM server (e.g. before interception). According to at least one embodiment, the source device may be identified by inspecting the tuple information included in the packet header. Once the source device has been identified, the BOOM server determines (32) or selects the appropriate BOOM client servers (BCSs) for receiving a forwarded copy of the SYN packet. A detailed description relating to the technique of how the BOOM server selects the appropriate clients is presented in a latter section of this application, entitled Scaling Issues.

Additionally, according to a specific embodiment, the BOOM server may also assign (32) a unique starting sequence number for each selected BOOM client server. As explained in greater detail below, the starting sequence number assigned by the BOOM server may be used by a BOOM client server when generating a response to the source device. Moreover, using the assigned sequence number data, the BOOM server is able to subsequently identify a successful BOOM client server (of the selected BOOM client servers) which generated a response that was received first at the source device.

Next, as shown at 34, the BOOM server encapsulates the intercepted SYN packet in accordance with an encapsulation tunneling protocol so that the encapsulated packet may be tunneled to the selected BOOM client servers of the overlay network. According to a specific embodiment, the encapsulated packet will include all information relating to the originally intercepted SYN packet.

After the BOOM server has encapsulated the intercepted SYN packet, the BOOM server replicates the encapsulated packet, and transmits (36a, 36b) the encapsulated packet (along with other desired information) to the selected BOOM client servers in the overlay network using an encapsulation tunneling protocol. An example of an encapsulated packet is shown in FIG. 3 of the drawings.

Figure 3:
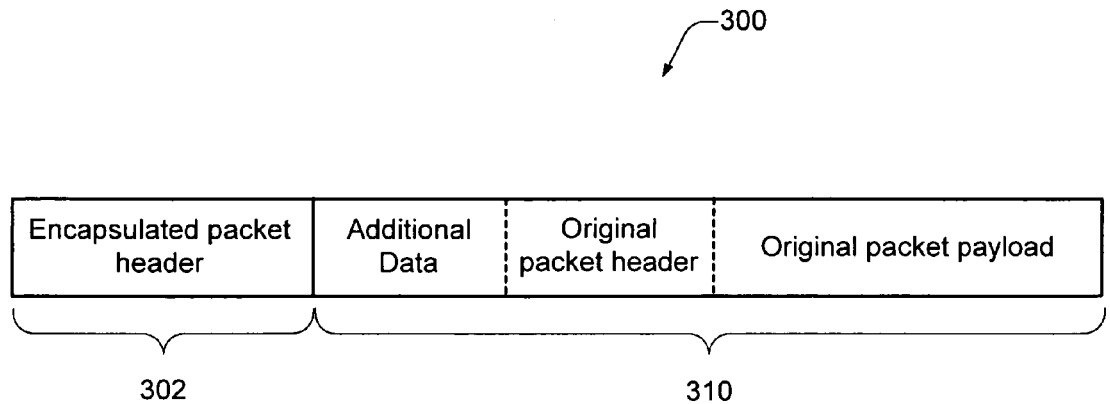
FIG. 3 shows a block diagram of a packet 300 which has been encapsulated in accordance with an encapsulation tunneling protocol.

FIG. 3 shows a block diagram of a packet 300 which has been encapsulated in accordance with an encapsulation tunneling protocol. As shown in FIG. 3, the encapsulated packet which is transmitted by the BOOM server 220 to the BOOM client servers 206 comprises a header portion 302, and a payload portion 310. The header portion 302 typically includes tuple data such as, for example, a source IP address, a destination IP address, a source port number, and a destination port number. The payload portion 310 includes all information from the original SYN packet intercepted by the BOOM server 220. Additionally the payload portion 310 may also include additional data generated by the BOOM server such as, for example, starting sequence number data to be used by the receiving BOOM client server in responding to the SYN packet (described in greater detail below), and trigger data relating to a specific time value at which the BOOM client server receiving the encapsulated packet is to transmit a response to the client 202. The encapsulated packet 300 of FIG. 3 may be implemented in accordance with a variety of encapsulation tunneling protocols, such as, for example, GRE, IP/IP, LP2, etc. Additional information relating to packet encapsulation and tunneling protocols is described in RFC document number 2026, incorporated herein by reference in its entirety for all purposes.

For purposes of simplification and clarity, the example of FIGS. 6A and 6B illustrate the BOOM server 220 tunneling a replica of the encapsulated SYN packet to BOOM client server A (206a) and BOOM client server B (206b). However, it will be appreciated that a replica of the encapsulated packet may be tunneled or transmitted to any desired number of client servers in the overlay network. For example, as explained in greater detail below, the BOOM server 220 may forward a replica of the encapsulated SYN packet to 10 specific BOOM client servers, a portion of which have been selected based upon the identity of the client which sent the SYN packet.

When the encapsulated SYN packet is received at each of the selected BOOM client servers, each BOOM client server processes the encapsulated SYN packet, and generates (38a, 38b) a respective spoofed response to the SYN segment. However, unlike the procedure followed by the conventional TCP protocol, the BOOM client server sequence number associated with the spoofed response includes information for identifying the particular BOOM client server which generated the spoofed response.

For example, according to one embodiment, the BOOM client server sequence number (SEQ) of the spoofed SYN, ACK response corresponds to the IP address of the BOOM client server which generated the spoofed response. According to an alternate embodiment, the BOOM server 220 may assign each BOOM client server with a unique starting sequence number. The BOOM server 220 may then include the assigned starting sequence number data in the encapsulated packet(s) transmitted to each selected BOOM client server.

As shown in the example of FIG. 6A, BOOM client server A 206a generates a spoofed SYN, ACK response which includes a sequence number SEQ=<BCS(A) ID>, where <BCS(A) ID> represents an identifier unique to BOOM client server A such as, for example, the IP address of BOOM client server A. Similarly, as shown in FIG. 6A, BOOM client server B generates a spoofed SYN, ACK response which includes a sequence number SEQ=<BCS(B) ID>, which uniquely identifies BOOM client server B. According the embodiment of FIG. 6A, each spoofed response generated by a particular BOOM client server is configured to appear as thought the response were actually generated by the host server 222.

The technique of spoofing is commonly known to those having ordinary skill in the art, and is described, for example, in U.S. Pat. Nos. 6,016,388, 5,892,903, and 6,006,266, each of which is herein incorporated by reference in its entirety for all purposes. Additional server spoofing techniques are described in currently pending U.S. patent application Ser. No. 08/946,867 for METHOD AND APPARATUS FOR FACILITATING NETWORK DATA TRANSMISSIONS. filed Oct. 8, 1997; and U.S. Provisional Patent Application No. 60/168,862 for METHOD AND APPARATUS FOR REDIRECTING NETWORK TRAFFIC, filed Dec. 2, 1999, each of which is incorporated herein by reference in its entirety for all purposes.

Each spoofed SYN, ACK response is generated using the original, intercepted SYN packet included in the encapsulated packet. One reason for encapsulating and tunneling the SYN packet to the selected BOOM client servers is to enable the original packet to be routed appropriately, and to provide each of the selected BOOM client servers with the exact, original SYN segment intercepted by the BOOM server. It will be appreciated that because each BOOM client server spoofs the host server, the spoofed response to the client system will pierce any intervening fire walls.

As shown in FIG. 6A, BOOM client server A and BOOM client server B each transmit (39a, 39b) their respective spoofed SYN, ACK responses to client system 202 at substantially the same time. In this way, each of the selected BOOM client servers participate in a race to be the first one to provide a response to client 202. Presumably, the topologically closest BOOM client server will have the shortest propagation delay to the client. However, due to network congestion or other factors, the topologically closest BOOM client server to the client 202 may not necessarily win the response race. Fortunately, in accordance with the technique of the present invention, if the topologically closest BOOM client server (of the selected plurality of BOOM client servers participating in the race) does not win the response race to the client system, it will typically be the case that the next topologically closest BOOM client server (of the selected plurality of BOOM client servers) will win the race.

In accordance with the technique of the present invention, a variety of different techniques may be used to ensure that all of the selected BOOM client servers transmit their respective responses to the client 202 at substantially the same time. These techniques are described in greater detail in a latter section of this application, entitled Timing Issues.

Referring to the network topology example of FIG. 2, it is assumed that BOOM client server B 206b has the shortest propagation delay to client 202. Thus, given that each of the BOOM client servers 206a, 206b, 206c transmits a respective SYN, ACK response at substantially the same time to client 202, it is assumed that the SYN, ACK response transmitted by BOOM client server B 206b is the first spoofed response to be received at client 202.

When the first spoofed SYN, ACK response is received at client 202, the client opens (40) a client-side connection to the desired destination IP address (e.g., the IP address of the host server 222) using data from the first received SYN, ACK response. After receiving the SYN, ACK segment, the client generates (42) an ACK response to the first received SYN, ACK segment. The ACK response will include a client sequence number (SEQ=n+1), and an acknowledgment sequence number. In accordance with the standard TCP protocol, the acknowledgment sequence number generated by client 202 is equal to the value of the host sequence number (specified in the SYN, ACK response) incremented by 1. Thus, according the embodiment of FIG. 6A, the acknowledgment sequence number generated by the client 202 will be equal to the numeric value of the IP address of BOOM client server B, incremented by 1 (e.g., ACK=<BCS(B) ID>+1).

According to a specific embodiment, the host server may be included as one of the BOOM client servers for purposes of implementing the technique of the present invention. However, it will be appreciated that the host server does not generate a spoofed response. Alternatively, according to a different embodiment, it may be preferable to minimize the amount of traffic interacting with the host server. Thus, according to a specific implementation, access to the host service may be restricted to the BOOM client servers of the overlay network. Alternatively, according to yet another embodiment of the present invention, the BOOM server forwards an intercepted request to the host server only after a specified time has elapsed. According to this later embodiment, the BOOM server first waits to see whether any one of the selected BOOM client servers is able to respond to the requesting client within a specified time window. If the selected BOOM client servers are not able to respond to the requesting client device within the specified time window, the BOOM server may then forward the intercepted SYN packet to the host server.

At some point after the first SYN, ACK packet is received at client 202, the client will begin receiving duplicate SYN, ACK responses from the other selected BOOM client servers. For example, as shown in FIG. 6A, client 202 will receive a duplicate SYN, ACK response from BOOM client server A. As shown at 44, the client responds to the duplicate SYN, ACK responses by generating an acknowledgment (ACK) response using the acknowledgment sequence number corresponding the first received SYN, ACK response (from BOOM client server B).

Each ACK segment generated by the client 202 is transmitted (46) to the host server 222, where it is intercepted by BOOM server 220. When the BOOM server receives the first ACK from client 202, it processes (48) the ACK segment and identifies the successful BOOM client server (e.g., BOOM client server B) which won the race. According to a specific embodiment the BOOM server identifies the successful BCS by analyzing the acknowledgment (ACK) sequence number provided in the first received ACK segment from client 202. For example, according to a specific implementation, the BOOM server subtracts 1 from the acknowledgement sequence number in order to obtain the unique identity of the successful BOOM client server. The BOOM server then associates (50) the client tuple (e.g., client IP address and port information located in the header of the received ACK packet) with the identified, successful BOOM client server. Thereafter, the BOOM server will forward all subsequent packets related to that TCP flow to the identified, successful BOOM client server (e.g., BOOM client server B).

As shown at 51, the BOOM server encapsulates the first received ACK segment in accordance with an encapsulation tunneling protocol. The encapsulated ACK packet is then transmitted (52a) by the BOOM server to the identified, successful BOOM client server (BOOM client server B) using an encapsulation tunneling protocol. When the BOOM client server B server receives the tunneled ACK segment, it completes the three-way TCP hand shaking protocol by opening up a server side connection with the identified client.

Additionally, as shown in the embodiment of FIG. 6A, after the BOOM server has identified the successful BOOM client server which won the race, the BOOM server transmits (52b) a TCP reset request to each of the other selected BOOM client servers which participated in the race to thereby cause each of these BOOM client servers to reset (53) their respective TCP state machines associated with that particular TCP flow. Thereafter, any duplicate ACK packets received at the BOOM server relating to that TCP flow may be ignored.

After the TCP hand-shaking protocol between the client and server has been completed, the client may then access data from the server such as, for example, by way of an HTTP request. This is illustrated in FIG. 6B of the drawings.

Referring to the example of FIG. 6B, it is assumed that client 202 desires to send an HTTP request to host server 222 (FIG. 2). It is to be noted that, at this point, the client is still unaware that it has actually been receiving responses from BOOM client server B, rather than the host server 222. Accordingly, at 54, the client transmits an HTTP request to the host server 222. The BOOM server intercepts (56) the HTTP request, and analyses the packet to identify (58) the client tuple information associated with the intercepted packet. Using the TCP handshaking information (e.g. ACK segment) provided by client 202, the BOOM server identifies (60) the successful BOOM client server (BOOM client server B) associated with the identified client tuple. The intercepted HTTP request packet is then encapsulated (62) and transmitted (64) by the BOOM server, using an encapsulation tunneling protocol, to the identified, successful BOOM client server (e.g. BOOM client server B). The successful BOOM client server, seeing that it is spoofing the host server, reads (66) the HTTP request, but does not respond with data. Rather, the successful BOOM client server issues (68) a spoofed HTTP redirect response (e.g., 302 HTTP redirect) to the client, wherein the redirect address corresponds to the IP address of the successful BOOM client server (e.g., BOOM client server B). The client receives and processes (70) the redirect response, and subsequently transmits (72) the previous HTTP request to the specified redirect address, which is the IP address of the successful BOOM client server. From this point forward, the client may communicate directly with the successful BOOM client server using TCP.

Timing Issues

As described previously with respect to the example of FIG. 6A, it is important that all of the selected BOOM client servers which receive a replica of the encapsulated SYN packet (from BOOM server 220) transmit their respective spoofed responses to the identified source device (e.g., client 202) at substantially the same time. The example of FIG. 4 helps illustrate the importance of this concept.

Figure 4:
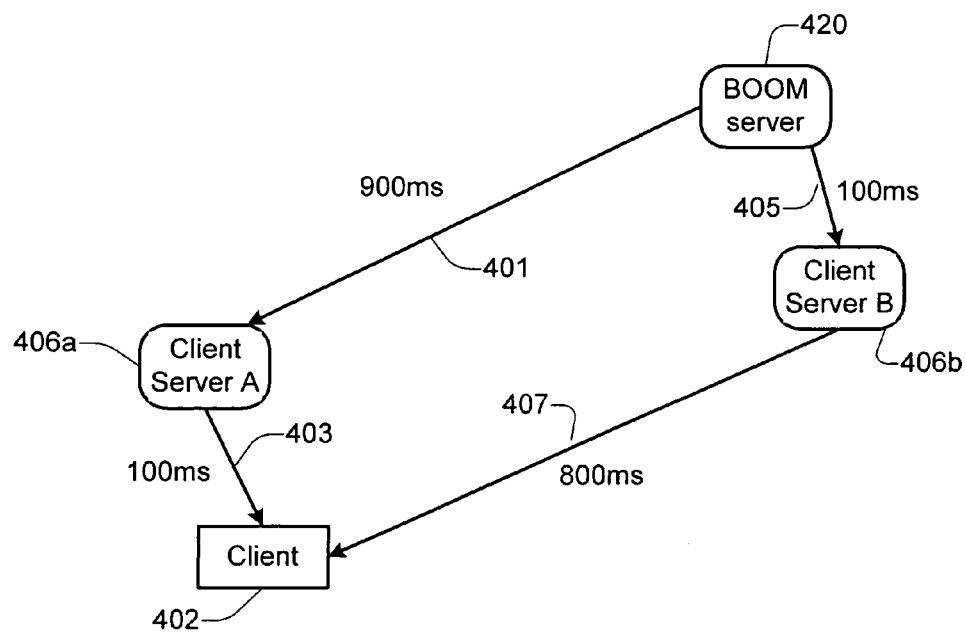
FIG. 4 shows an example of a specific topological configuration of various devices in a data network.

FIG. 4 shows an example of a specific topological configuration of various devices in a data network. Like the example of FIG. 2, the BOOM server 420 of FIG. 4 tunnels encapsulated client packets (received from client 402) to client servers 406a and 406b. The client servers process the encapsulated client packet and generate spoofed responses which are then transmitted back to the client 402. The one-way propagation delay time values between the various devices of FIG. 4 are identified by reference numbers 401, 403, 405, and 407. Thus, for example, the one-way propagation delay value between BOOM server 420 and client server A 406a is 900 milliseconds; the one-way propagation delay value between BOOM server 420 and client server B 406b is 100 milliseconds; the one-way propagation delay between client server A 406a and client 402 is 100 milliseconds; and the one-way propagation delay between client server B 406b and client 402 is 800 milliseconds.

According to at least one embodiment of the present invention, with each new flow, the BOOM server conducts a race between each of the selected client servers in order to determine which of the selected client servers is the first to respond to a particular client. Preferably, the race begins when each of the client servers (e.g., 406a, 406b) transmits its respective spoofed response to client 402 at substantially the same time. The client server associated with the spoofed response which is first received at client 402 is the winner of the race, and is designated the successful client server. In the example of FIG. 4, assuming that client server A and client server B each transmit their responses at substantially the same time, client server A will be designated the successful client server. However, it will be appreciated that if the race were to start from BOOM server 420 (e.g. from the time when the BOOM server forwards the intercepted client packet to the selected client servers), then, according to the example of FIG. 4, client server B would win the race since the total propagation delay of paths 405 and 407 is less than the total propagation delay of paths 401 and 403. Accordingly, it is preferable that any propagation delays which exist between the BOOM Server 420 and the plurality of client servers (406a, 406b) be normalized or mitigated in order to assure that each of the client servers responds to the client 402 at substantially the same time.

According to the technique of the present invention, there are several techniques for causing all selected client servers to simultaneously respond to a client request forwarded from the BOOM server 420. According to a first embodiment, the BOOM server 420 may periodically send trace packets to each of the client servers in the overlay network in order to determine the respective one-way propagation delay value associated with communicating with each of the client servers. Thus, for example, referring to FIG. 4, the BOOM server may send trace packets to client server A 406a and client server B 406b in order to determine a roundtrip propagation delay value to each of these client servers. Using the roundtrip propagation delay values, the BOOM server is then able to compute the one-way propagation delay value associated with communicating with each respective client server. Thereafter, the BOOM server 420 may stagger the transmission time of each replica of the encapsulated packet (e.g., SYN packet) to thereby cause the encapsulated packets to be received at each of the selected client servers at substantially the same time (e.g. within 10 milliseconds of each other). Thus, for example, at time T=0 ms the BOOM server may transmit the a first replica of the encapsulated client packet to client server A, and at time T=800 ms the BOOM server may transmit a second replica of the encapsulated client packet to client server B, resulting in client server A and client server each receiving a replica of the encapsulated client packet at time T=900 milliseconds. At this point, the race begins for each client server to be the first one to successfully transmit a spoofed response to the encapsulated packet that is first received at client 402.

Alternatively, rather than staggering the transmission times at BOOM server 420, the BOOM server may include a respective trigger time value in each encapsulated packet specifying a precise time in which a particular client server is to transmit its spoofed response. For example, at time T=0 ms, the BOOM server may forward a first replica of the encapsulated packet to client server A, along with a trigger delay time value $T_d=0$ ms, which indicates that the client server A may immediately respond to the forwarded packet once received. Additionally, on or about time T=0 ms, the BOOM server also forwards a second replica of the encapsulated client packet to client server B, along with a trigger delay time value $T_d=800$ ms, which causes client server B to delay transmitting its spoofed response to the client packet until 800 milliseconds have elapsed after the encapsulated packet has been received. In this way, each of the client servers 406a and 406b will transmit the respective spoofed responses to client machine 402 at or about time T=900 milliseconds.

It will be appreciated that the above-described timing techniques are particularly useful in systems where an asynchronous relationship exists between any of the devices (e.g., BOOM server, client servers) in the overlay network.

According to an alternate embodiment of the present invention, the BOOM server and each of the client servers in the overlay network are all synchronized to a common time reference. For example, according to a specific implementation, additional hardware and/or software is provided for synchronizing the BOOM server and each of the respective BOOM client servers which allows each server to be synchronized to a common time reference associated, for example, with a global positioning satellite (GPS) system. In this example each of the servers in the overlay network may be configured to support a network time protocol (NTP), which is commonly known to one having ordinary skill in the art. A respective hardware device may additionally be installed at each server location which allows a server to receive Stratum 1 resolution time data using the NTP protocol. This is shown for example in FIG. 5 in the drawings.

Figure 5:
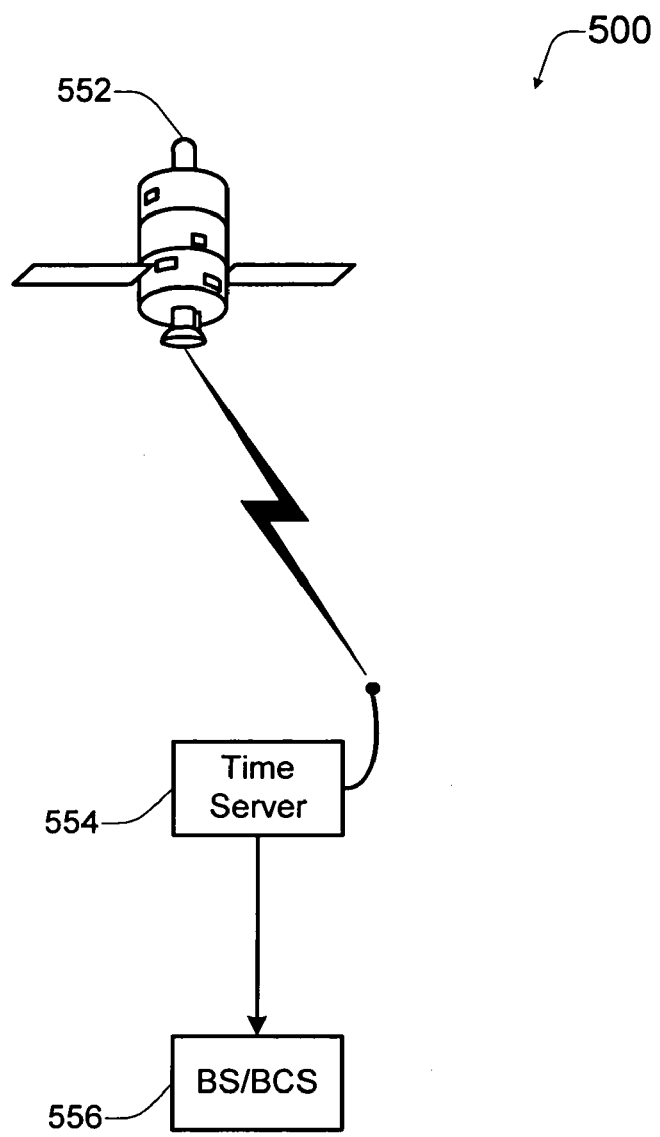
FIG. 5 shows a block diagram illustrating how synchronization may be achieved between each of the servers in the overlay network of the present invention.

FIG. 5 shows a block diagram illustrating how synchronization may be achieved between each of the servers in the overlay network of the present invention. A separate time server 554 may be connected to each server or device in the overlay network. The time server receives precise clock data (e.g., Stratum 1 resolution) from an orbiting satellite 552 which is part of a global satellite positioning system. The time server 554 converts a received time reference data into an NTP format which is then transmitted to the associated BOOM server or BOOM client server 556. According to a specific implementation time server device 554 may be implemented using a time server device manufactured by True Time, Inc., of Santa Rosa, Calif.

Assuming that synchronization has been achieved between each of the servers in the overlay network, the BOOM server 220 (FIG. 2) may then transmit, to selected BOOM client servers, encapsulated packets which include trigger information relating to a specific time at which each of the selected BOOM client servers is to transmit its response to the client 202. Thus, for example, referring to FIG. 4, during the time interval between time T=0 and T=10 milliseconds, the BOOM server may transmit encapsulated, tunneled packets to client server A and client server B. Each encapsulated packet will include information relating to the intercepted SYN packet, and additional information specifying, for example, the respective starting sequence number (SEQ) to be used by each BOOM client server, and a trigger time value of $T_T=1,000$ ms. It is preferable that the specific trigger time value selected by the BOOM server be sufficiently far in advance to allow time for each of the selected client servers to receive the encapsulated packet and generate a spoofed response to the SYN packet. Thereafter, at the specified trigger time (e.g. T=1000 ms), the race begins, and each of the selected client servers transmits its spoofed response to client 402.

Scaling Issues

As described previously, when the BOOM server intercepts a client packet, it forwards the intercepted packet to a selected portion of the client servers in the overlay network using a multicast technique. Thus, it will be appreciated that for every packet the BOOM server intercepts, it may forward the intercepted packet to N client servers in the overlay network. However, while the technique of the present invention works very well where N is relatively small (e.g., N<100), scaling problems may arise in situations where N is relatively large (e.g. N>10,000). For example, referring to FIG. 2, if the overlay network includes 10,000 BOOM client servers, and the BOOM server 220 forwards a copy of an intercepted SYN packet to each BOOM client server in the overlay network, the client 202 (which issued the SYN packet) may be bombarded with as many as 10,000 responses. This, in turn, may result in network congestion and/or failure at the client. While it may seem desirable to limit the size of N to a relatively small value, it will also be appreciated that, by increasing the size of N, there is an increased chance of selecting the optimal client server in the overlay network for servicing a particular client.

Accordingly, one problem to solve relates to determining an optimal value for N. Additionally a second problem to solve relates to determining which particular client servers should be included within the N client servers selected, to respond to the intercepted packet. The optimal solution to these problems may require searching an enormous solution space. Moreover, as the number of BOOM client servers and/or clients increases, the solution space becomes exponentially larger. Even worse, since the Internet is a dynamic entity, the solutions may change in response to dynamic changes in the Internet topology such that a previously optimal solution may become a undesirable solution.

The above-described issues collectively exemplify the problems associated with combinatorial minimization. In combinatorial minimization, there is an objective function to be minimized, but the number of elements in the solution space is factorially large so that it cannot be explored exhaustively. The present inventive entity has provided a solution to the above-described problems by adapting a technique known as simulated annealing, which derives its name based upon its similarity to the thermodynamic property of metals as they cool and anneal.

Figure 7:
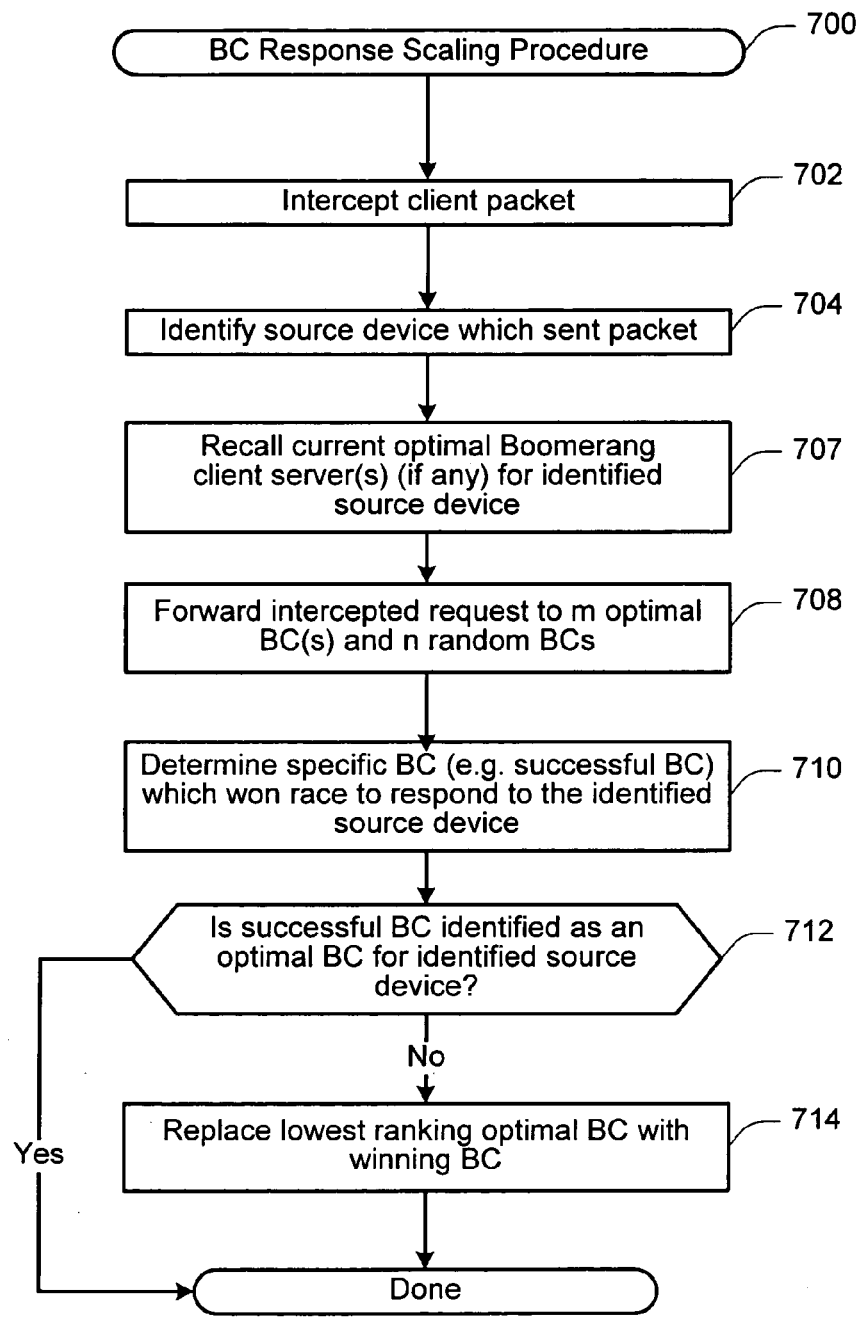
FIG. 7 shows a flow diagram of a BCS Response Scaling Procedure 700 in accordance with a specific embodiment of the present invention.

FIG. 7 shows a flow diagram of an BCS Response Scaling Procedure 700 in accordance with a specific embodiment of the present invention. The BCS Response Scaling Procedure 700 of FIG. 7 illustrates a specific embodiment of how the above-described scaling problems may be resolved in accordance with the technique of the present invention.

At 702, a client packet is intercepted by the BOOM server. The intercepted packet will typically be implemented using a specific protocol such as, for example, TCP, DNS, UDP, etc., and will also include information identifying the source device which sent the intercepted packet. For example, the intercepted packet may be a SYN packet generated by client 202 (FIG. 2). After intercepting the packet, the BOOM server analyzes the packet information to identify (704) the source device which issued the packet. In this example, the BOOM server would identify the source device as client 202. At 706, the BOOM server recalls all current optimal BOOM client server(s), if any, for the identified source device (e.g., client 202). According to at least one embodiment, an optimal BOOM client server corresponds to a successful BOOM client server which has recently won at least one response race to the identified source device. According to a specific implementation, the BOOM server maintains a record of the three most recent BOOM client servers which have succeeded in winning the response race to the identified source device. It will be appreciated, however, that the number of optimal BOOM client servers (BCSs) associated with a specific source device may vary, depending upon design preferences.

Once the BOOM server has identified a pre-determined number m (e.g., m=3) of optimal BCSs associated with the identified source device, the BOOM server forwards (708) an encapsulated copy of the intercepted packet to the m optimal BCSs, and additionally forwards replicas of the encapsulated packet to n random BCSs. According to a specific implementation, the BOOM server will forward an separate encapsulated copy of the intercepted packet to seven randomly selected BOOM client servers within the overlay network (not including the m optimal BOOM client servers). However, it will be appreciated that the number n may be adjusted as desired, depending upon design specifications.

After copies of the encapsulated packet have been forwarded to the selected BOOM client servers, a particular one of the selected BOOM client servers will be identified as the successful BCS which won the race in responding the identified source device. For example, as described in FIG. 6A of the drawings, the BOOM server determines the successful BOOM client server using the acknowledgement sequence number from the ACK segment sent by client 202. Thus, as shown at 710, the BOOM server identifies the successful BCS which won the race in responding to the identified source device.

After the BOOM server has identified the successful BCS, it determines (712) whether the successful BCS is already identified as an optimal BCS for the identified source device. If the successful BCS is already identified as an optimal BCS for the identified source device, no change is made to list of optimal BCSs associated with the identified source device. However, if the successful BCS is not identified as an optimal BCS for the identified source device, at 714, the BOOM server includes the successful BCS in the list of optimal BCSs associated with the identified source device. Additionally, according to a specific embodiment, when a new successful BCS is added to the list of optimal BCSs associated with a particular source device, a lowest ranking BCS from the optimal BCSs list is displaced. In one embodiment, the lowest ranking optimal BCS may be defined as the least recent optimal BCS to have won the response race to the identified source device.

Thus, according to at least one embodiment, the BCS Response Scaling Procedure 700 may be adapted to account for successful BCSs that die or suffer from network congestion by maintaining an "optimal BCS" list of the n most recent successful BCSs (e.g., n=3) for each identified source device in the data network. Additionally, the successful BCSs associated with a particular optimal BCS list may be sorted according to each BCS's most recent success, so that their status corresponds to a natural decay. Further, after the procedure 700 reaches a steady state for a particular source device (e.g., when there are no changes made to the optimal BCS list associated with a particular identified source device after a pre-determined number of cycles), the total number of BOOM client servers selected by the BOOM server to respond to an intercepted packet associated with the identified source device may be reduced (e.g., from a total of 10 forwarded packets to a total of 5 forwarded packets).

In general, the BCS Response Scaling Procedure provides the BOOM server with the ability to "learn" the best set of BOOM client servers for a particular identified source device. Moreover, this is accomplished without the use of an Internet map (such as that used by Akamai), is accomplished without requiring the use of agents to communicate between the various nodes, and further is accomplished without requiring assumptions to be made about the distribution of the BOOM client servers or the identified source devices in the network. Additionally, it will be appreciated that the BCS Response Scaling Procedure may be used to automatically and dynamically update and maintain optimal BCS lists in response to dynamic changes in the Internet topology.

It will be appreciated that the BCS Response Scaling Procedure 700 of FIG. 7 may require a substantial amount of memory resources for implementation. For example, each possible source device in the data network may have associated with it 10 IP addresses and a plurality of data structure pointers. Additionally, because the procedure is continuously learning and improving, it may be preferable to occasionally save current results to a stable storage.

Additionally, it will be appreciated that the technique of the present invention for distributing network traffic to a closest replica of a particular object may be implemented without the use of a gateway router between the client and the server. This feature is particularly important in modern ISP networks which include numerous, geographically disbursed data centers within a broadband mesh. Moreover, ISPs implementing such networks typically do not provide end user dial ports and, therefore, do not have traditional gateway routers.

Moreover, the technique of the present invention for routing network traffic provides a number of other advantages over map-based algorithms, such as, for example, the above-described Akamai technique. For example, one advantage of the technique of the present invention is that it may be implemented using normal Internet routing protocols, and does not require the building or maintaining of a network map. Additionally, the technique of the present invention is able to provide more accurate results than conventional map-based techniques since routing decisions using the technique of the present invention are based upon current network conditions. In contrast, map-based routing techniques base their routing decisions on potentially outdated map information which may be minutes or hours old, depending upon the frequency and correctness of the map updates. Further, the technique of the present invention may be easily implemented and configured in an existing network. The technique of the present invention is also more scalable than map-based routing techniques. Additionally, the technique of the present invention offers flexibility in that it may be easily set up both locally (e.g. on an ISP network) and globally (e.g. on the Internet). Further, unlike conventional routing techniques such as Akamai, the technique of the present invention does not require modification of the original content of the host server and/or client servers of the overlay network.

Other Embodiments

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the BOOM server and BOOM client servers of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the BOOM server and BOOM client server devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the BOOM server and BOOM client server devices may be implemented on a general-purpose network host machine such as a personal computer or workstation. Further, the invention may be at least partially implemented on a card (e.g., an interface card) for a network device or a general-purpose computing device.

Figure 8:
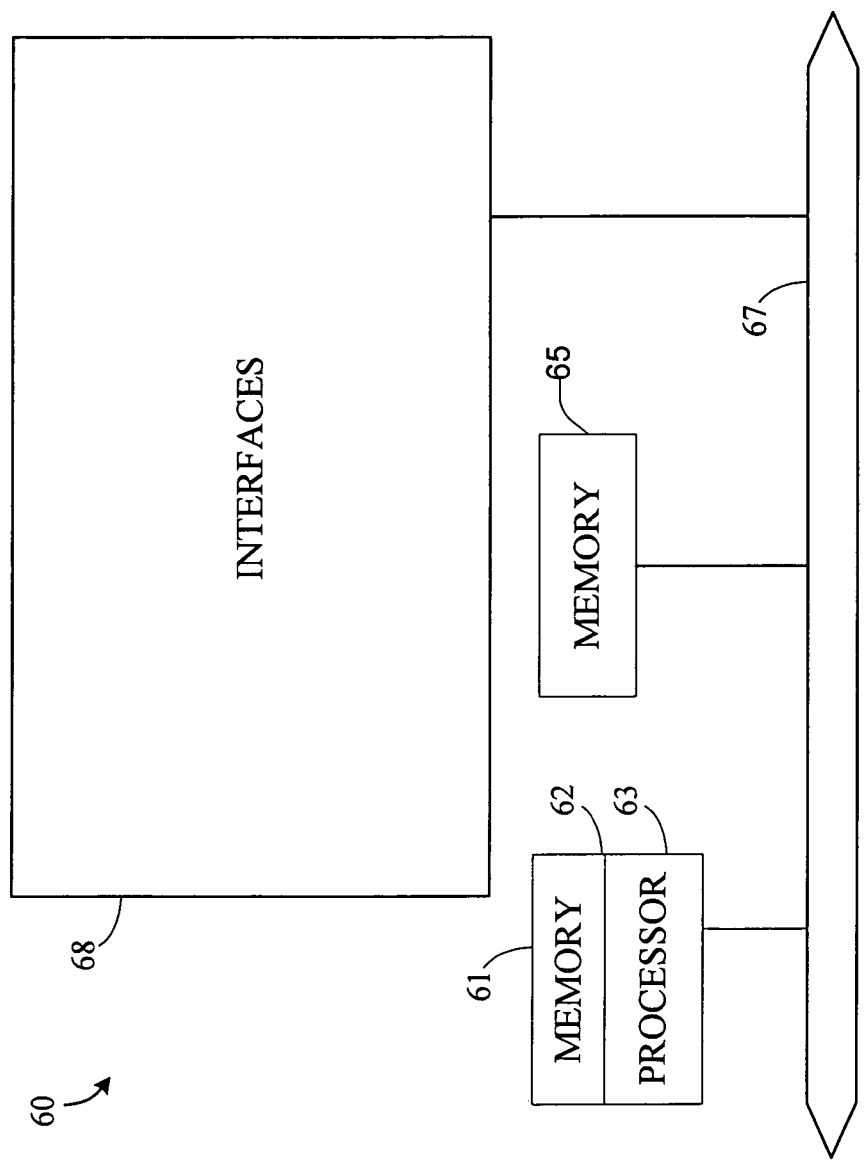
FIG. 8 shows a block diagram of a network device 60 suitable for implementing the BOOM server or BOOM client server devices of the present invention.

Referring now to FIG. 8, a network device 60 suitable for implementing the BOOM server or BOOM client server devices of the present invention includes a master central processing unit (CPU) 62, interfaces 68, and a bus 67 (e.g., a PCI bus). When acting under the control of appropriate software or firmware, the CPU 62 may be responsible for implementing specific functions associated with a particular device of the present invention. For example, when configured as a BOOM server, the CPU 62 may be responsible for intercepting and analyzing packets, encapsulating packets, forwarding packets to appropriate BOOM client servers, etc. When configured as a BOOM client server, the CPU 62 may be responsible for generating an appropriate spoofed response to an encapsulated packet received from the BOOM server. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the BOOM server of BOOM client server devices described herein. The program instructions may control the operation of an operating system and/or one or more applications, for example. The memory or memories may also be configured to store data structures which associate specific client systems with one or more specific (e.g. successful) BOOM client servers of the overlay network.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for routing traffic in a data network, the data network including a sub-network of client servers which include information corresponding to information stored on at least one host server, the method comprising:
   receiving, at a first device, a first packet, the first packet having an associated source device and an associated destination device;
   selecting a first portion of the client servers for forwarding information relating to the first packet, wherein the first portion includes two or more client servers;
   forwarding information relating to the first packet from the first device to the first portion of the client servers;
   determining a specific trigger time reference value for causing each of the first portion of client servers to transmit a respective spoofed response to the first packet at a time corresponding to the trigger time reference value; and
   transmitting said trigger time reference value to each of the first portion of client servers along with the forwarded first packet information to thereby cause each of the first portion of client servers to transmit a respective response to the source device at substantially the same time.

2. The method of claim 1 wherein the first portion of client servers are selected using information relating to the source device associated with the first packet.

3. The method of claim 1 further comprising:
   assigning a unique starting sequence number to each of the first portion of client servers, wherein each starting sequence number corresponds to a SYN, ACK segment of a TCP protocol, wherein the assigning is performed by the intermediary device.

4. The method of claim 3 further comprising causing each of the first portion of client servers to include its assigned starting sequence number in its response transmitted to the source device.

5. The method of claim 1 wherein the source device corresponds to a client system.

6. The method of claim 1 wherein said forwarding further includes:
   encapsulating the received first packet in accordance with an encapsulation tunneling protocol; and
   transmitting the encapsulated packet to each of the first portion of client servers using the encapsulation tunneling protocol.

7. The method of claim 6 further comprising:
   receiving, at a first client server, the encapsulated packet;
   generating, at said first client server using information from said received encapsulated packet, a first spoofed response to said first packet; and
   transmitting said first spoofed response to the source device.

8. The method of claim 7 wherein the first packet utilizes a TCP protocol, and wherein the first spoofed response comprises a TCP acknowledgement segment having an associated sequence number, the sequence number including information relating to an identity of the first client server.

9. The method of claim 1 further comprising determining a respective propagation delay value associated with communicating with each client server of at least the first portion of client servers; and
   using the propagation delay information to forward the information relating to the first packet to the first portion such that the forwarded first packet information is received at each of the first portion of client servers at substantially the same time.

10. The method of claim 1 further comprising:
    receiving, at the source device, a plurality of responses to the first packet from at least some of the first portion of client servers;
    processing an earliest received response of the plurality of received responses in accordance with a first technique, wherein said first technique includes using information from the earliest received response at the source device to conduct subsequent communication transactions; and
    processing at least one duplicate responses to the first packet in accordance with a second technique, wherein said second technique includes not using information from the at least one duplicate received response at the source device to conduct subsequent communication transactions.

11. The method of claim 10 wherein said plurality of responses are received using a TCP protocol.

12. The method of claim 1:
    wherein said selecting includes identifying at least one preferred client server associated with the identified source device; and
    wherein said first plurality of client servers includes said at least one preferred client server and at least one randomly selected client server from the sub-network.

13. The method of claim 12 further comprising:
    identifying a successful client server of said first portion of client servers associated with generating a response to the first packet which was first received at the source device; and
    if the identified client server is not classified as a preferred client server for communicating with the identified source device, classifying the identified client server as one of the at least one preferred client servers for communicating with the identified source device.

14. The method of claim 13 further comprising selecting a least preferred one of the at least one preferred client servers for preferred status degradation in response to the identified client server being classified as a preferred client server.

15. The method of claim 1 wherein the first packet utilizes a TCP protocol, the method further comprising:
    receiving a TCP acknowledgement (ACK) segment from the source device, said ACK segment having an associated sequence number which includes information relating to an identity of a successful client server of the first plurality of client servers which generated a response to the forwarded first packet information that was first received at the source device;
    identifying the successful client server using information from the received ACK segment;
    encapsulating the received ACK segment in accordance with an encapsulation tunneling protocol; and
    transmitting, using the encapsulation tunneling protocol, the encapsulated packet to the successful client server.

16. The method of claim 15 further comprising issuing a TCP reset packet to each of the other client servers of the first portion of client servers which are not identified as the successful client server.

17. The method of claim 1 further comprising:
    identifying a successful client server of said first portion of client servers associated with generating a response to the first packet which was first received at the source device;
    receiving a second packet from said source device, said second packet relating to a request to access data from said destination device;
    encapsulating the second packet;
    tunneling the encapsulated second packet to the successful client server;
    generating, at the successful client server, a spoofed response to the source device, wherein the spoofed response includes a redirect response.

18. A method for routing traffic in a data network, the data network including a sub-network of client servers which include information corresponding to information stored on at least one host server, the method comprising:
    receiving, at a first client server, a tunneled packet and timing information from an intercept server, said tunneled packet including encapsulated information relating to a first request received at the intercept server, said first packet having an associated source address and an associated destination address, said source address corresponding to a source device;
    generating, at said first client server, a first spoofed response to said first request; and
    transmitting said first spoofed response to the source device so that the first spoofed response is transmitted at a time specified by the timing information received from the intercept server.

19. The method of claim 18 wherein the first spoofed response includes information for identifying the first client server.

20. The method of claim 18 wherein the first spoofed response is generated using information from said received tunneled packet.

21. The method of claim 18 wherein the first request corresponds to a SYN segment of a communication utilizing a TCP protocol, and wherein the first spoofed response comprises a SYN, ACK segment which includes a first sequence number, the first sequence number including information relating to an identity of the first client server.

22. The method of claim 21 wherein the tunneled packet includes information relating to the first sequence number included in the SYN, ACK segment, said method further comprising utilizing the first sequence number information in generating the first spoofed response.

23. The method of claim 21 wherein the sequence number corresponds to an IP address of the first client server.

24. The method of claim 18 wherein the tunneled packet includes transmission timing information relating to a specific trigger time at which the first client server is to transmit the first spoofed response to the source device, said method further comprising transmitting the first spoofed response to the source device at the specific trigger time.

25. The method of claim 18 wherein the tunneled packet includes transmission timing information relating to a specific transmission delay time value in which the first client server is to delay transmission of the first spoofed response to the source device, said method further comprising delaying transmission of the first spoofed response to the source device until a time period corresponding to the transmission delay time value has elapsed.

26. The method of claim 18 further comprising:
receiving, at a second client server, a second tunneled packet and timing information from an intercept server, said tunneled packet including encapsulated information relating to a first request received at the intercept server;
generating, at said second client server, a second spoofed response to said first request, wherein the second spoofed response includes information for identifying the second client server; and
transmitting said second spoofed response to the source device at substantially a same time that said first spoofed response is transmitted to the source device.

27. The method of claim 26 wherein the first request corresponds to a SYN segment of a communication utilizing a TCP protocol, and wherein the second spoofed response comprises a SYN, ACK segment which includes a second sequence number, the second sequence number including information relating to an identity of the second client server.

28. The method of claim 18 wherein the second tunneled packet includes information relating to a specific trigger time for transmitting a response to the source device; and
wherein said transmitting includes transmitting the first and second spoofed responses from each respective client server to the source device at a time value corresponding to the specific trigger time.

29. The method of claim 28 further comprising synchronizing said intercept server, said first client servers and said second client server.

30. A computer program product for routing traffic in a data network, the data network including a sub-network of client servers which include information corresponding to information stored on at least one host server, the computer program product comprising:
a computer usable medium having computer readable code embodied therein, the computer readable code comprising:
computer code for receiving, at a first device, a first packet, the first packet having an associated source device and an associated destination device;
computer code for selecting a first portion of the client servers for forwarding information relating to the first packet, wherein the first portion includes two or more client servers;
computer code for forwarding information relating to the first packet from the first device to the first portion of the client servers;
computer code for determining a specific trigger time reference value for causing each of the first portion of client servers to transmit a respective spoofed response to the first packet at a time corresponding to the trigger time reference value; and
computer code for transmitting said trigger time reference value to each of the first portion of client servers along with the forwarded first packet information to thereby cause each of the first portion of client servers to transmit a respective response to the source device at substantially the same time.

31. The computer program product of claim 30 further comprising computer code for determining a respective propagation delay value associated with communicating with each client server of at least the first portion of client servers; and
computer code for using the propagation delay information to forward the information relating to the first packet to the first portion such that the forwarded first packet information is received at each of the first portion of client servers at substantially the same time.

32. A computer program product for routing traffic in a data network, the data network including a sub-network of client servers which include information corresponding to information stored on at least one host server, the computer program product comprising:
a computer usable medium having computer readable code embodied therein, the computer readable code comprising:
computer code for receiving, at a first client server, a tunneled packet and timing information from an intercept server, said tunneled packet including encapsulated information relating to a first request received at the intercept server; said first packet having an associated source address and an associated destination address, said source address corresponding to a source device;
computer code for generating, at said first client server, a first spoofed response to said first request; and
computer code for transmitting said first spoofed response to the source device so that the first spoofed response is transmitted at a time specified by the timing information received from the intercept server.

33. The computer program product of claim 32 wherein the tunneled packet includes transmission timing information relating to a specific trigger time at which the first client server is to transmit the first spoofed response to the source device, said computer program product further comprising computer code for transmitting the first spoofed response to the source device at the specific trigger time.

34. The computer program product of claim 32 wherein the tunneled packet includes transmission timing information relating to a specific transmission delay time value in which the first client server is to delay transmission of the first spoofed response to the source device, said computer program product further comprising computer code for delaying transmission of the first spoofed response to the source device until a time period corresponding to the transmission delay time value has elapsed.

35. A system for facilitating a client device to access a specific server in a data network, the system comprising:
a sub-network of client servers which include information corresponding to information stored on at least one host server; and at least one intercept server configured or designed to intercept at least one packet routed to the at least one host server, said intercept server being further configured or designed to identify a source device associated with the intercepted packet;

said intercept server being further configured or designed to forward information relating to the first packet to a selected portion of the client servers, wherein the first portion includes two or more client servers;

wherein said intercept server is further configured or designed to determine a trigger time value for cause each of the selected portion of client servers to transmit a respective response to the first packet at the specified trigger time; and wherein said intercept server is further configured or designed to transmit said trigger time value to each of the selected portion of client servers along with the forwarded first packet information to thereby cause each of the selected portion of client servers to transmit a respective response to the source device at substantially the same time.

36. The system of claim 35 wherein said intercept server is further configured or designed to encapsulate the received first packet in accordance with an encapsulation tunneling protocol, and is further configured or designed to transmit the encapsulated packet to each of the selected portion of client servers using the encapsulation tunneling protocol.

37. The system of claim 35 wherein said intercept server is further configured or designed to determine a respective propagation delay value associated with communicating with each client server of at least the selected portion of client servers, and is further configured or designed to transmit said first packet information to each of the selected portion of client servers at specific times such that the forwarded first packet information is received at each of the selected portion of client servers at substantially the same time.

38. A method for routing traffic in a data network, the data network including a sub-network of client servers which include information corresponding to information stored on at least one host server, the method comprising:

receiving, at a first device, a first packet from a source device destined to a host server;

selecting a first portion of the client servers for forwarding information relating to the first packet, wherein the first portion includes two or more client servers;

forwarding information relating to the first packet from the first device to the first portion of the client servers;

determining a respective propagation delay value associated with communicating with each client server of at least the first portion of client servers;

using the propagation delay information to generate a respective transmission delay time value for each of the first portion of client servers; and transmitting said transmission delay time values to each respective client server of the first portion of client servers along with the forwarded first request information to thereby cause each of the first portion of client servers to delay transmission of its respective spoofed response to the source device until a time period corresponding to the transmission delay time value has elapsed.

39. The method of claim 38 wherein the respective spoofed response from each of the first portion of client servers is transmitted to the source device at substantially the same time.

40. The method of claim 38 further comprising determining a respective propagation delay value associated with communicating with each client server of at least the first portion of client servers; and using the propagation delay information to forward the information relating to the first packet to the first portion such that the forwarded first packet information is received at each of the first portion of client servers at substantially the same time.

41. A system for routing traffic in a data network, the data network including a sub-network of client servers which include information corresponding to information stored on at least one host server, the system comprising:

at least one processor;

at least one interface configured or designed to provide a communication link to at least one other network device in the data network; and memory;

the system being configured or designed to receive, at a first device, a first packet from a source device destined to a host server;

the system being configured or designed to select a first portion of the client servers for forwarding information relating to the first packet, wherein the first portion includes two or more client servers;

the system being configured or designed to forward information relating to the first packet from the first device to the first portion of the client servers;

the system being configured or designed to determine a respective propagation delay value associated with communicating with each client server of at least the first portion of client servers;

the system being configured or designed to use the propagation delay information to generate a respective transmission delay time value for each of the first portion of client servers; and the system being configured or designed to transmit said transmission delay time values to each respective client server of the first portion of client servers along with the forwarded first request information to thereby cause each of the first portion of client servers to delay transmission of its respective spoofed response to the source device until a time period corresponding to the transmission delay time value has elapsed.

42. The system of claim 41 wherein the respective spoofed response from each of the first portion of client servers is transmitted to the source device at substantially the same time.

43. The system of claim 41 wherein the first portion of client servers are selected using information relating to the source device associated with the first packet.

44. The system of claim 41 being further configured or designed to assign a unique starting sequence number to each of the first portion of client servers, wherein each starting sequence number corresponds to a SYN, ACK segment of a TCP protocol, wherein the assigning is performed by the intermediary device.

45. The system of claim 44 being further configured or designed to cause each of the first portion of client servers to include its assigned starting sequence number in its response transmitted to the source device.

46. The system of claim 41 being further configured or designed to:

encapsulate the received first packet in accordance with an encapsulation tunneling protocol; and transmit the encapsulated packet to each of the first portion of client servers using the encapsulation tunneling protocol.

47. The system of claim 41 being further configured or designed to:

determine a respective propagation delay value associated with communicating with each client server of at least the first portion of client servers; and use the propagation delay information to forward the information relating to the first packet to the first portion such that the forwarded first packet information is received at each of the first portion of client servers at substantially the same time.

48. The system of claim 41 being further configured or designed to:

identify at least one preferred client server associated with the source device; and wherein said first plurality of client servers includes said at least one preferred client server and at least one randomly selected client server from the sub-network.

49. The system of claim 48 being further configured or designed to:

identify a successful client server of said first portion of client servers associated with generating a response to the first packet which was first received at the source device; and if the identified client server is not classified as a preferred client server for communicating with the identified source device, classifying the identified client server as one of the at least one preferred client servers for communicating with the identified source device.

50. The system of claim 49 being further configured or designed to select a least preferred one of the at least one preferred client servers for preferred status degradation in response to the identified client server being classified as a preferred client server.

51. The system of claim 41 wherein the first packet utilizes a TCP protocol, the system being further configured or designed to:

receive a TCP acknowledgement (ACK) segment from the source device, said ACK segment having an associated sequence number which includes information relating to an identity of a successful client server of the first plurality of client servers which generated a response to the forwarded first packet information that was first received at the source device;

identify the successful client server using information from the received ACK segment;

encapsulating the received ACK segment in accordance with an encapsulation tunneling protocol; and transmit, using the encapsulation tunneling protocol, the encapsulated packet to the successful client server.

52. The system of claim 51 being further configured or designed to issue a TCP reset packet to each of the other client servers of the first portion of client servers which are not identified as the successful client server.

53. The system of claim 41 being further configured or designed to:

identify a successful client server of said first portion of client servers associated with generating a response to the first packet which was first received at the source device;

receive a second packet from said source device, said second packet relating to a request to access data from said destination device;

encapsulating the second packet;

tunnel the encapsulated second packet to the successful client server; and generate, at the successful client server, a spoofed response to the source device, wherein the spoofed response includes a redirect response.

54. A system for routing traffic in a data network, the data network including a sub-network of client servers which include information corresponding to information stored on at least one host server, the system comprising:

at least one processor;

at least one interface configured or designed to provide a communication link to at least one other network device in the data network; and memory;

the system being configured or designed to receive, at a first device, a first packet, the first packet having an associated source device and an associated destination device;

the system being configured or designed to select a first portion of the client servers for forwarding information relating to the first packet, wherein the first portion includes two or more client servers;

the system being configured or designed to forward information relating to the first packet from the first device to the first portion of the client servers;

the system being configured or designed to determine a specific trigger time reference value for causing each of the first portion of client servers to transmit a respective spoofed response to the first packet at a time corresponding to the trigger time reference value; and the system being configured or designed to transmit said trigger time reference value to each of the first portion of client servers along with the forwarded first packet information to thereby cause each of the first portion of client servers to transmit a respective response to the source device at substantially the same time.

55. The system of claim 54 wherein the first portion of client servers are selected using information relating to the source device associated with the first packet.

56. The system of claim 54 being further configured or designed to assign a unique starting sequence number to each of the first portion of client servers, wherein each starting sequence number corresponds to a SYN, ACK segment of a TCP protocol, wherein the assigning is performed by the intermediary device.

57. The system of claim 56 being further configured or designed to cause each of the first portion of client servers to include its assigned starting sequence number in its response transmitted to the source device.

58. The system of claim 54 being further configured or designed to:

encapsulate the received first packet in accordance with an encapsulation tunneling protocol; and transmit the encapsulated packet to each of the first portion of client servers using the encapsulation tunneling protocol.

59. The system of claim 54 being further configured or designed to:

determine a respective propagation delay value associated with communicating with each client server of at least the first portion of client servers; and use the propagation delay information to forward the information relating to the first packet to the first portion such that the forwarded first packet information is received at each of the first portion of client servers at substantially the same time.

60. The system of claim 54 being further configured or designed to:
- identify at least one preferred client server associated with the source device; and
- wherein said first plurality of client servers includes said at least one preferred client server and at least one randomly selected client server from the sub-network.

61. The system of claim 60 being further configured or designed to:
- identify a successful client server of said first portion of client servers associated with generating a response to the first packet which was first received at the source device; and
- if the identified client server is not classified as a preferred client server for communicating with the identified source device, classifying the identified client server as one of the at least one preferred client servers for communicating with the identified source device.

62. The system of claim 61 being further configured or designed to select a least preferred one of the at least one preferred client servers for preferred status degradation in response to the identified client server being classified as a preferred client server.

63. The system of claim 54 wherein the first packet utilizes a TCP protocol, the system being further configured or designed to:
- receive a TCP acknowledgement (ACK) segment from the source device, said ACK segment having an associated sequence number which includes information relating to an identity of a successful client server of the first plurality of client servers which generated a response to the forwarded first packet information that was first received at the source device;
- identify the successful client server using information from the received ACK segment;
- encapsulating the received ACK segment in accordance with an encapsulation tunneling protocol; and
- transmit, using the encapsulation tunneling protocol, the encapsulated packet to the successful client server.

64. The system of claim 63 being further configured or designed to issue a TCP reset packet to each of the other client servers of the first portion of client servers which are not identified as the successful client server.

65. The system of claim 54 being further configured or designed to:
- identify a successful client server of said first portion of client servers associated with generating a response to the first packet which was first received at the source device;
- receive a second packet from said source device, said second packet relating to a request to access data from said destination device;
- encapsulating the second packet;
- tunnel the encapsulated second packet to the successful client server; and
- generate, at the successful client server, a spoofed response to the source device, wherein the spoofed response includes a redirect response.

66. A system for routing traffic in a data network, the data network including a sub-network of client servers which include information corresponding to information stored on at least one host server, the system comprising:
- means for receiving, at a first device, a first packet, the first packet having an associated source device and an associated destination device;
- means for selecting a first portion of the client servers for forwarding information relating to the first packet, wherein the first portion includes two or more client servers;
- means for forwarding information relating to the first packet from the first device to the first portion of the client servers;
- means for determining a specific trigger time reference value for causing each of the first portion of client servers to transmit a respective spoofed response to the first packet at a time corresponding to the trigger time reference value; and
- means for transmitting said trigger time reference value to each of the first portion of client servers along with the forwarded first packet information to thereby cause each of the first portion of client servers to transmit a respective response to the source device at substantially the same time.

67. The system of claim 66 further comprising means for assigning a unique starting sequence number to each of the first portion of client servers, wherein each starting sequence number corresponds to a SYN, DCK segment of a TCP protocol, and wherein the assigning is performed by the intermediary device.

68. The system of claim 67 further comprising means for causing each of the first portion of client servers to include its assigned starting sequence number in its response transmitted to the source device.

69. The system of claim 66 wherein said forwarding further includes:
- means for encapsulating the received first packet in accordance with an encapsulation tunneling protocol; and
- means for transmitting the encapsulated packet to each of the first portion of client servers using the encapsulation tunneling protocol.

70. The system of claim 69 further comprising:
- means for receiving, at a first client server, the encapsulated packet;
- means for generating, at said first client server using information from said received encapsulated packet, a first spoofed response to said first packet; and
- means for transmitting said first spoofed response to the source device.

71. The system of claim 66 further comprising means for determining a respective propagation delay value associated with communicating with each client server of at least the first portion of client servers; and
- means for using the propagation delay information to forward the information relating to the first packet to the first portion such that the forwarded first packet information is received at each of the first portion of client servers at substantially the same time.

72. The system of claim 66 further comprising:
- means for receiving, at the source device, a plurality of responses to the first packet from at least some of the first portion of client servers;
- means for processing an earliest received response of the plurality of received responses in accordance with a first technique, wherein said first technique includes using information from the earliest received response at the source device to conduct subsequent communication transactions; and
- means for processing at least one duplicate responses to the first packet in accordance with a second technique, wherein said second technique includes not using information from the at least one duplicate received response at the source device to conduct subsequent communication transactions.

73. The system of claim 66:
wherein said selecting means includes means for identifying at least one preferred client server associated with the identified source device; and
wherein said first plurality of client servers includes said at least one preferred client server and at least one randomly selected client server from the sub-network.

74. The system of claim 73 further comprising:
means for identifying a successful client server of said first portion of client servers associated with generating a response to the first packet which was first received at the source device; and
if the identified client server is not classified as a preferred client server for communicating with the identified source device, means for classifying the identified client server as one of the at least one preferred client servers for communicating with the identified source device.

75. The system of claim 74 further comprising means for selecting a least preferred one of the at least one preferred client servers for preferred status degradation in response to the identified client server being classified as a preferred client server.

76. The system of claim 66 wherein the first packet utilizes a TCP protocol, the system further comprising:
means for receiving a TCP acknowledgement (DCK) segment from the source device, said DCK segment having an associated sequence number which includes information relating to an identity of a successful client server of the first plurality of client servers which generated a response to the forwarded first packet information that was first received at the source device;
means for identifying the successful client server using information from the received DCK segment;
means for encapsulating the received DCK segment in accordance with an encapsulation tunneling protocol; and
means for transmitting, using the encapsulation tunneling protocol, the encapsulated packet to the successful client server.

77. The system of claim 66 further comprising:
means for identifying a successful client server of said first portion of client servers associated with generating a response to the first packet which was first received at the source device;
means for receiving a second packet from said source device, said second packet relating to a request to access data from said destination device;
means for encapsulating the second packet;
means for tunneling the encapsulated second packet to the successful client server;
means for generating, at the successful client server, a spoofed response to the source device, wherein the spoofed response includes a redirect response.

* * * * *